United States Patent
Maynard et al.

(10) Patent No.: US 10,009,661 B2
(45) Date of Patent: Jun. 26, 2018

(54) METHODS AND APPARATUS FOR VARIABLE DELAY COMPENSATION IN NETWORKS

(71) Applicant: Time Warner Cable Enterprises LLC, New York, NY (US)

(72) Inventors: Stephen L. Maynard, Arvada, CO (US); Tho Autruong, Boulder, CO (US); John Callahan, Broomfield, CO (US); Nicholas Nielsen, Erie, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days. days.

(21) Appl. No.: 14/188,548

(22) Filed: Feb. 24, 2014

(65) Prior Publication Data
US 2014/0237524 A1  Aug. 21, 2014

Related U.S. Application Data

(63) Continuation of application No. 13/117,851, filed on May 27, 2011, now Pat. No. 8,661,481, which is a
(Continued)

(51) Int. Cl.
*H04N 21/6587* (2011.01)
*H04N 21/2387* (2011.01)
(Continued)

(52) U.S. Cl.
CPC ..... *H04N 21/6587* (2013.01); *H04L 12/2801* (2013.01); *H04N 7/17336* (2013.01);
(Continued)

(58) Field of Classification Search
CPC .......... H04N 21/2387; H04N 21/6587; H04N 21/47202; H04N 21/47217;
(Continued)

(56) References Cited

U.S. PATENT DOCUMENTS 5,477,263 A    12/1995   O'Callaghan et al.
5,596,420 A    1/1997    Daum
(Continued)

OTHER PUBLICATIONS

Efficient Delivery of Streaming Interactive Video (Multimedia, Video on Demand), Dey, J.; vol. 59-02b, University of Massachusetts, 1998 discloses video delivery systems that deliver data from a server to clients across a high speed network.

*Primary Examiner* — Randy A Flynn
(74) *Attorney, Agent, or Firm* — Gazdzinski & Associates, PC

(57) ABSTRACT

Methods and apparatus for performing dynamic compensation for delays over extant infrastructure within a content-based network. In one embodiment, the network comprises a cable network, and the infrastructure comprises that nominally used for on-demand (OD) services such as VOD. The method includes periodically or situationally assessing variable delays within the system associated with functional commands (such as "trick mode" commands), and dynamically compensating for these variable delays in order to improve the accuracy and timeliness of the user's trick mode command. This approach increases user satisfaction, and obviates the issuance of additional compensatory trick mode commands that only further degrade the performance of the network.

20 Claims, 8 Drawing Sheets

Related U.S. Application Data continuation of application No. 11/056,625, filed on Feb. 11, 2005, now Pat. No. 7,954,128.

(51) Int. Cl.
*H04N 21/24* (2011.01)
*H04N 21/472* (2011.01)
*H04N 21/647* (2011.01)
*H04L 12/28* (2006.01)
*H04N 7/173* (2011.01)

(52) U.S. Cl.
CPC ..... *H04N 21/2387* (2013.01); *H04N 21/2402* (2013.01); *H04N 21/47202* (2013.01); *H04N 21/47217* (2013.01); *H04N 21/64738* (2013.01)

(58) Field of Classification Search
CPC ......... H04N 21/64738; H04N 21/2402; H04N 7/17336; H04L 12/2801
See application file for complete search history.

(56) References Cited

U.S. PATENT DOCUMENTS

| | | | |
|---|---|---|---|
| 5,610,841 A * | 3/1997 | Tanaka et al. | 725/115 |
| 5,861,906 A | 1/1999 | Dunn et al. | |
| 5,873,022 A | 2/1999 | Huizer et al. | |
| 5,926,206 A | 7/1999 | Mihara et al. | |
| 5,963,202 A | 10/1999 | Polish | |
| 6,020,912 A | 2/2000 | De Lang | |
| 6,065,050 A | 5/2000 | Demoney | |
| 6,434,748 B1 | 8/2002 | Shen et al. | |
| 6,480,667 B1 | 11/2002 | O'Connor | |
| 6,577,809 B2 | 6/2003 | Lin et al. | |
| 6,598,228 B2 | 7/2003 | Hejna, Jr. | |
| 6,642,939 B1 * | 11/2003 | Vallone et al. | 715/721 |
| 6,751,802 B1 | 6/2004 | Huizer et al. | |
| 6,850,691 B1 | 2/2005 | Stam et al. | |
| 6,965,724 B1 * | 11/2005 | Boccon-Gibod | H04N 5/783 386/344 |
| 6,993,787 B1 | 1/2006 | Kamel et al. | |
| 7,114,173 B2 | 9/2006 | Undang et al. | |
| 7,200,669 B2 | 4/2007 | Cheung | |
| 7,231,132 B1 | 6/2007 | Davenport | |
| 7,263,275 B2 | 8/2007 | Demas | |
| 7,317,797 B2 | 1/2008 | Vince | |
| 7,336,886 B2 | 2/2008 | Hsi | |
| 7,676,142 B1 * | 3/2010 | Hung | H04N 21/4325 348/446 |
| 7,733,919 B2 * | 6/2010 | Liu et al. | 370/516 |
| 7,844,729 B1 * | 11/2010 | Friedman | H04L 41/12 709/238 |
| 2002/0015577 A1 * | 2/2002 | Negishi et al. | 386/68 |
| 2002/0016970 A1 | 2/2002 | Negishi et al. | |
| 2002/0059619 A1 | 5/2002 | Lebar | |
| 2002/0133722 A1 * | 9/2002 | Levanon | H04N 21/64784 726/7 |
| 2003/0093543 A1 * | 5/2003 | Cheung et al. | 709/231 |
| 2003/0093803 A1 | 5/2003 | Ishikawa et al. | |
| 2003/0118243 A1 * | 6/2003 | Sezer | G06T 9/005 382/245 |
| 2003/0126211 A1 * | 7/2003 | Anttila et al. | 709/205 |
| 2003/0131126 A1 | 7/2003 | Cheung et al. | |
| 2003/0149988 A1 | 8/2003 | Ellis et al. | |
| 2003/0192060 A1 * | 10/2003 | Levy | H04N 5/783 725/133 |
| 2003/0208765 A1 * | 11/2003 | Urdang | H04N 5/782 725/90 |
| 2003/0208767 A1 | 11/2003 | Williamson et al. | |
| 2003/0212997 A1 * | 11/2003 | Hejna, Jr. | H04N 21/47217 725/88 |
| 2003/0217365 A1 | 11/2003 | Caputo | |
| 2004/0078828 A1 * | 4/2004 | Parchman et al. | 725/135 |
| 2005/0190794 A1 | 9/2005 | Krause et al. | |
| 2006/0007960 A1 | 1/2006 | Liu et al. | |
| 2006/0036750 A1 | 2/2006 | Ladd | |
| 2006/0078297 A1 * | 4/2006 | Nishikawa | H04N 5/76 386/243 |

* cited by examiner

METHODS AND APPARATUS FOR VARIABLE DELAY COMPENSATION IN NETWORKS

PRIORITY

This application is a continuation of and claims priority to co-owned, U.S. patent application Ser. No. 13/117,851 filed on May 27, 2011 and issuing as U.S. Pat. No. 8,661,481 on Feb. 25, 2014 and which claims priority to co-owned U.S. patent application Ser. No. 11/056,625 filed Feb. 11, 2005, which issued as U.S. Pat. No. 7,954,128 on May 31, 2011, both of the same title, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the fields of video and data transmission. In one aspect, the invention relates to the use of a variable or dynamically determined delay function within a session-based video or data streaming application.

2. Description of Related Technology

The provision of session-based services, such as e.g., video on-demand (VOD), is well known in the prior art. In a typical configuration, the VOD service makes available to its users a selection of multiple video programs that they can choose from and watch over a network connection with minimum setup delay. At a high level, a typical VOD system consists of one or more VOD servers that pass and/or store the relevant content; one or more network connections that are used for program selection and program delivery; and customer premises equipment (CPE) to receive, decode and present the video on a display unit. The content is distributed to the CPE over, e.g., a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

In U.S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

"Trick Modes"

So-called "trick modes" are well known in the digital cable television networking arts. Trick modes generally comprise VCR-like commands issued by a user via their CPE during VOD session playback. They are generally implemented as one or more data packet structures that must be sent back over at least a portion of the HFC network (i.e., "upstream") to the content server, where they are acted upon. Such action typically comprises instigation of the requested action in the video stream (e.g., pause, rewind, fast forward, etc.), as well as the issuance of a response packet acknowledging the user's (CPE) request.

Trick mode packets are typically sent and responded to in a relatively short amount of time; however, this time can vary significantly based upon, e.g., network and server load, as well as other factors. Such load (and other factors) may vary somewhat predictably as a function of time or other parameters, yet may also be largely unpredictable under certain circumstances. For example, network load within a given service or geographic area may increase predictably during prime time viewing hours, yet may increase unpredictably due to other unforeseeable events such as the onset of inclement weather in that area, causing more subscribers to stay inside and view OD or similar content.

Prior art trick mode implementations compensate for these variations with a static or constant value that is subtracted from the desired play-back time (NPT) which does not always cover the actual delay in a loaded system. For example, consider the case illustrated in FIG. 1 (and Table 1 below) where the user initiates the command at time T=0, and there are A milliseconds (msec.) of user response time, B msec. of CPE processing delay, and C msec. of packet (e.g., LCSP command) generation and queuing delay through the network, commonly referred to as "NetIO" (e.g., packet and queuing delay from a serving network node back to the relevant service point within the network, such as a VOD server or the like). The actual de-queuing, decoding and generation of an appropriate (e.g., LCSP) response at the service point may take another D msec. to which is added another E msec. of processing delays at the serving node, and F msec. of processing time at the CPE upon receipt of the signal. These various delays (A-F) are also added to the delay in the user perceiving the requested change in the transport stream content (P), and propagation delays (Z) within the network, although the propagation delays are generally predictable and constant for a given signal path. Hence, the total time (T) from the user deciding that a command is to be implemented to their perception that the command has been implemented in this example is T=A+B+C+D+E+F+P+Z msec. Since at least a portion of this time (i.e., the C, D and E segments) may vary as a function of network or server loading or yet other factors, the total response time is variable.

TABLE 1

| Item | Description | Typical Value |
| --- | --- | --- |
| A | User response time | 250 to 333 msec. |
| B | STB response time | <1 msec. |
| C | Packet TX queue delay | varies w/ network traffic |
| D | Server RX, process, & TX time | varies w/ server load |
| E | Packet RX queue delay | varies w/ network traffic |
| F | STB processing time | <1 msec. |

Using the aforementioned prior art "static" approach, the constant correction value (e.g., 333 to 500 msec. typically) is subtracted from the normal play time (NPT) coordinate, in order to account for delays inherent in the system associated with servicing the trick mode command. As is well known, NPT is a value associated with a temporal content stream or the like which advances in real-time in the "normal" play mode, yet which advances faster than real-time when the stream is fast-forwarded such as via a trick mode function. Similarly, NPT will decrement when the rewind function is invoked, and is fixed when the stream is paused. The prior art approach of a static compensation value at least in theory provides a purposely oversized window within which any fixed and variable delays will fit. Stated differently, the actual (including variable) delays of the system should in theory be smaller in magnitude than the subtracted constant value.

However, it is sometimes the case where such delays do not fall within this window (such as during high loading periods), and hence an undesirable and highly perceivable latency in trick mode operation is created. This problem can be unpredictable, and may also manifest itself in the inaccurate execution of the requested command; e.g., a "rewind" command may place the viewer at a point in the content stream different from that which they desires by over-rewinding or under-rewinding the stream. This creates somewhat of a self-perpetuating (and potentially uncontrolled) load excursion within the system, since when a given user perceives that their trick mode command has not been (properly) serviced, they will almost invariably make a second attempt to invoke the same or a compensatory command, such as by pressing the same (rewind) button on their remote or DSTB one or more additional times to get to the desired point in the stream, or alternatively by fast-forwarding where their first command result in an "over-rewind" condition that placed them back too far in the stream.

Hence, extra (and unnecessary) trick-mode commands are issued by the user's CPE to correct the "missed" stream segment target, which loads an already heavily-loaded system even more. When multiplied by a potentially large number of OD or other session-based users within a network at any given time, these additional commands may cause significantly heavier network traffic, which further exacerbates the problem. In extreme situations, the serving network apparatus may appear totally unresponsive to the user's repeated commands, or be executed with such inaccuracy, so that the user becomes extremely frustrated.

Various other approaches to providing the "trick mode" functionality discussed above are m evidence in the prior art. For example, U.S. Pat. No. 5,477,263 to O'Callaghan, et al. issued Dec. 19, 1995 entitled "Method and apparatus for video on demand with fast forward, reverse and channel pause" discloses a video distribution system, wherein methods and apparatus for channel selection are implemented to reduce the channel-to-channel latencies which might otherwise occur in video decoding systems, such as MPEG-2. In addition, methods and apparatus are implemented for providing fast forward, fast reverse and channel pause functionality when utilizing staggered start times for a particular program source.

U.S. Pat. No. 5,963,202 to Polish issued Oct. 5, 1999 entitled "System and method for distributing and managing digital video information in a video distribution network" discloses a video distribution network system that includes client configuration data, a client video buffer for storing video information, a client video driver coupled to the client video buffer for presenting a portion of the video information on a display device, a current status manager for determining current client status information indicative of the portion of video information presented, a computations engine coupled to the client video buffer and to the current status manager for forwarding a burst of video information to the client video buffer based on the client configuration data and on the client status information, and a video buffer controller coupled to the client video buffer for controlling storage of the burst in the client video buffer.

U.S. Pat. No. 6,020,912 to De Lang issued Feb. 1, 2000 entitled "Video-on-demand system" discloses a video-on-demand system comprises a server station and a user station. The server is adapted to transmit a selected television signal with operating data defining a selected one of various available sets of playback modes (normal, fast forward, slow forward, rewind, pause, etc.) in response to operating signals from the user station indicating the selected set of playback modes. Operating data which define the various available operating signals (the user interface) are fixed in the server and are transmitted by the server to the user station. Downloading of different sets of the user interface at different prices is possible. For example, a television program with commercials may be offered at a higher price if it includes the facility of fast forward during commercials.

U.S. Pat. No. 6,434,748 to Shen, et al. issued Aug. 13, 2002 entitled "Method and apparatus for providing VCR-like "trick mode" functions for viewing distributed video data" discloses an apparatus for providing VCR-like "trick mode" functions, such as pause, fast-forward, and rewind, in a distributed, video-on-demand program environment. Trick modes are supported by locally altering the viewing speed for each user who requests such functions, without affecting the operation of the central data source in any way. Thus, a number of viewers are ostensibly able to enjoy random access to video programming, including virtually continuous trick mode functionality.

U.S. Pat. No. 6,577,809 to Lin, et al. issued Jun. 10, 2003 entitled "User selectable variable trick mode speed" discloses user selection of a particular trick mode, wherein the number of pictures that are displayed can be adjusted to correspond with the selected trick mode speed based on a determined display time. Subsequently, the bandwidth usage can be can be determined to ensure that the "channel capacity between a playback device and a remote decoder has not been exceeded. For forward trick modes, in a case where the bandwidth between the playback device and the remote decoder would be exceeded, B-pictures can be uniformly eliminated throughout the playback segment. Where B-pictures were present and they have been eliminated, they can be replaced by dummy B-pictures. Again, if there is still insufficient bandwidth available between the playback device and remote decoder, then P-pictures can be eliminated from the playback segment and uniformly replaced by dummy P-pictures.

U.S. Pat. No. 6,751,802 to Huizer, et al. issued Jun. 15, 2004 entitled "Method of transmitting and receiving compressed television signals" discloses the transmission of MPEG encoded television signals from a Video-On-Demand server to a receiver via a network. Non-linear playback functions such as 'pause' and 'resume' require accurate control of the bit stream, taking account of typical network aspects such as network latency and remultiplexing. In order to allow the receiver to resume signal reproduction after a pause, position labels are inserted into the bit stream at positions where the server can resume transmission of the signal after an interruption. Upon a pause request, the decoder initially continues the reproduction until such a position label is detected. The subsequent bits delivered by the network are ignored, i.e. they are thrown away. Upon a request to resume reproduction, the receiver requests the server to retransmit the signal starting at the detected position. See also U.S. Pat. No. 5,873,022 to Huizer, et al. issued Feb. 16, 1999 entitled "Method of receiving compressed video signals using a latency buffer during pause and resume".

United States Patent Publication No. 20030093543 to Cheung, et al published May 15, 2003 entitled "Method and system for delivering data over a network" discloses a method and system for delivering data over a network to a number of clients, which may be suitable for building large-scale Video-on-Demand (VOD) systems. The method utilizes two groups of data streams, one responsible for minimizing latency while the other one provides the required interactive functions. In the anti-latency data group, uniform, or non-uniform or hierarchical staggered stream intervals may be used. The system based on this invention may have relatively small startup latency while users may enjoy some interactive functions that are typical of video recorders including fast-forward, forward-jump, and so on. See also United States Patent Application 20030131126 published Jul. 10, 2001

United States Patent Publication No. 20030228018 to Vince published Dec. 11, 2003 entitled "Seamless switching between multiple pre-encrypted video files" discloses a video on demand (VOD) system, including methods and apparatus for switching back and forth between two pre-encrypted files having changing encryption keys. Such switching back and forth may be required when a VOD server stores both a "normal" copy of a movie and a "special" copy such as a "trick-play" version for, e.g., fast forward and rewind effects. Instead of using keys with changing parities in both streams, the special stream is encrypted with keys using the same parity (even or odd), while the normal stream is encrypted with one dynamic key (odd or even) and one fixed key (even or odd).

"Efficient Delivery Of Streaming Interactive Video (Multimedia, Video On Demand)", Dey, J.; Vol. 59-02b, University of Massachusetts, 1998 discloses video delivery systems that deliver data from a server to clients across a high speed network. In particular, the problem of constant-bitrate (CBR) transport of variable-bit-rate (VBR) video is addressed. An algorithm is disclosed to compute the minimum client buffer required transmitting a VBR video using CBR transport, and it is noted that delaying the playback of a VBR video can reduce the CBR transmission rate and client buffer requirements. Provisioning of VCR like functionalities of Fast Forward, Rewind and Pause, in the context of delivering CBR video is also analyzed, and a system disclosed whereby VCR functionalities are provided with statistical guarantees ostensibly ensures that clients receive a desired quality service while resources at the server are used more efficiently. Algorithms to restart playback at the end of an interactive operation are also disclosed.

"Support For Service Scalability On Video-On-Demand End-Systems (Quality Of Service)"; Abram-Profeta, E. Vol. 59-07b, The University of Michigan, 1998 discloses use of a coarse-grained striping scheme in disk arrays in the context of a VOD system, as well as the use of clustered disk-array-based storage organizations to reduce service disruptions during content updates. For a given storage organization, scalability can be improved by hatching customers' requests and using multicast communication. For instance, in "Near-VoD" (NVoD), videos are sourced at equally-spaced intervals, thus allowing limited VCR functionality and guaranteeing specified maximum admission latency. A methodology to measure scalability and identify scalable alternatives to NVoD is also presented.

"Synchronization schemes for controlling VCR-like user interactions in interactive multimedia-on-demand (MOD) systems"; Chian Wang; Chung-Ming Huang, Comput. J. (UK), VOL. 47, NO. 2, Oxford University Press for British Comput. Soc., 2004 discloses control schemes that are based on the feedback-adaptive mechanism. Based on the control schemes, a multimedia-on-demand system in which text, image, graphics, audio and video media are transmitted from the server site to the client site through text, image, graphics, audio and video communication channels respectively, is described.

While the foregoing citations illustrate a broad variety of different prior art techniques for providing trick mode functionality, none specifically address the issue of variable trick mode command latency/inaccuracy in an effective and easily implemented fashion; i.e., without the need for significant modifications to the existing network infrastructure and/or the installed CPE base. Accordingly, improved methods and apparatus for managing variable network latencies associated with trick modes and other similar network service functions are needed. Such improved methods and apparatus would ideally be implemented with only slight modifications to the extant infrastructure and installed CPE base, and would significantly reduce network loading (and eliminate uncontrolled excursions in load). These techniques would also be transparent to the user, such that the dynamic compensation occurs seamlessly without the user perceiving its operation (other than an increased level of user satisfaction from more accurate command functionality).

SUMMARY OF THE INVENTION

The present invention addresses the foregoing needs by providing improved methods and apparatus for managing the performance (including the latency) of trick modes and other functions within content delivery networks such as cable and satellite networks.

In a first aspect of the invention, a method of operating network equipment within a cable network is disclosed. In one embodiment, the network equipment comprises a DSTB or other CPE having trick mode functionality, and the method comprises: obtaining a plurality of parameters; determining a first delay compensation value; generating a window function; and generating a second compensation value based at least in part on the first value and the window function. In one variant, the plurality of parameters are configurable by a system operator, and comprise a user response time, and a hysteresis or "window" parameter. The delay compensation value is determined by first taking a difference between timestamp values at first and second points within the network; and determining a one-way delay value for at least a portion of the network from the difference. The user response time is then added to the delay, and the hysteresis parameter applied, with the result being an adjustment to the normal play time (NPT) of a trick mode command. An optional rate adjustment for the scale of the trick mode command may also be applied.

In a second aspect of the invention, a method of providing trick mode functionality within a cable network is disclosed. In one embodiment, the method comprises: receiving a trick mode command from a user via a device operatively coupled to the network; dynamically generating a current compensation value for the trick mode command; and applying the compensation value to affect the delivery of data being provided to the user via the device. Dynamic generation of the compensation value comprises iteratively: (i) determining a new delay compensation value based at least on a plurality of parameters; (ii) generating a hysteresis function; and (iii) generating the current compensation value based at least in part on the new value and the hysteresis function.

In a third aspect of the invention, cable network equipment adapted to provide improved trick mode functionality is disclosed. In one embodiment, the equipment comprises: a processor; a storage device operatively coupled to the processor; a first computer program at least partly stored on the storage device and adapted to provide a user interface whereby the user can enter trick mode commands; and a second computer program at least partly stored on the storage device and adapted to dynamically generate a current compensation value for the trick mode command based at least in part on: (i) a plurality of configuration values provided by a node of the network; and (ii) dynamically determined values relating at least in part to delays within the network.

In a fourth aspect of the invention, storage apparatus adapted to store at least one computer program is disclosed. In one embodiment, the apparatus comprises: a storage medium; and at least one computer program stored on the medium, the at least one program being configured to facilitate trick mode functionality within a cable network, the program being adapted to: provide a user interface whereby the user of the network can enter one or more trick mode commands; and dynamically generate a current compensation value for the one or more trick mode commands based at least in part on: (i) a plurality of configuration values provided by a node of the network; and (ii) dynamically determined values relating at least in part to delays within the network.

In a fifth aspect of the invention, a method of compensating trick mode functions for variable delays within a content-based network is disclosed. In one embodiment, the method comprises: receiving a trick mode command from a user via a device operatively coupled to the network; dynamically generating a delay compensation value for the trick mode command based at least in part on a delay measured within the network; and applying the compensation value to at least one control parameter of the network.

In a sixth aspect of the invention, a method of increasing the accuracy of trick mode functions provided over a content-based network having variable delays is disclosed. In one embodiment, the method comprises: receiving a first trick mode command from a user via a device operatively coupled to the network; dynamically generating a delay compensation value for the trick mode command based at least in part on a delay measured within the network; applying the compensation value to at least one control parameter of the network; and selectively restricting the response to a second trick mode command issued by the user within a predetermined window of the first command.

In a seventh aspect of the disclosure, a method of enabling trick mode functionality to a device during a video on-demand (VOD) session is disclosed. In one embodiment, the method comprises: (i) receiving a trick mode command from a user via the device; (ii) generating a current compensation value for the trick mode command; (iii) adjusting the current compensation value based at least in part on a predicted delay to produce an adjusted current compensation value; and (iv) applying the adjusted current compensation value to data being provided to the user via the device. In one variant, the device is a consumer premises equipment, such as e.g., a settop box or satellite receiver.

In an eighth aspect of the disclosure, a method of operating a consumer device within a content delivery network is disclosed. In one embodiment, the method includes: (i) predicting a delay associated with the network based at least in part on previously determined operational parameters within the network; (ii) using the predicted delay to determine a delay compensation value; and (iii) responsive to a user of the device entering a trick mode command, applying the delay compensation value to a performance of the trick mode command.

In a ninth aspect of the disclosure, a consumer electronic device adapted to provide video control functionality is disclosed. In one embodiment, the device includes: a processor, a storage device operatively coupled to the processor, and at least one computer readable apparatus configured to run on the processor and comprising a plurality of instructions. In one variant, the instructions are configured to, when executed: (i) provide a user interface whereby the user can enter one or more video control functions; (ii) receive a plurality of dynamically determined values relating at least in part to operational parameters within the network; (iii) utilize the plurality of dynamically determined values to dynamically generate a current compensation value for the one or more video control functions; and (iv) apply the current compensation value to a performance of the one or more video control functions.

DETAILED DESCRIPTION OF THE INVENTION

Figure 1:
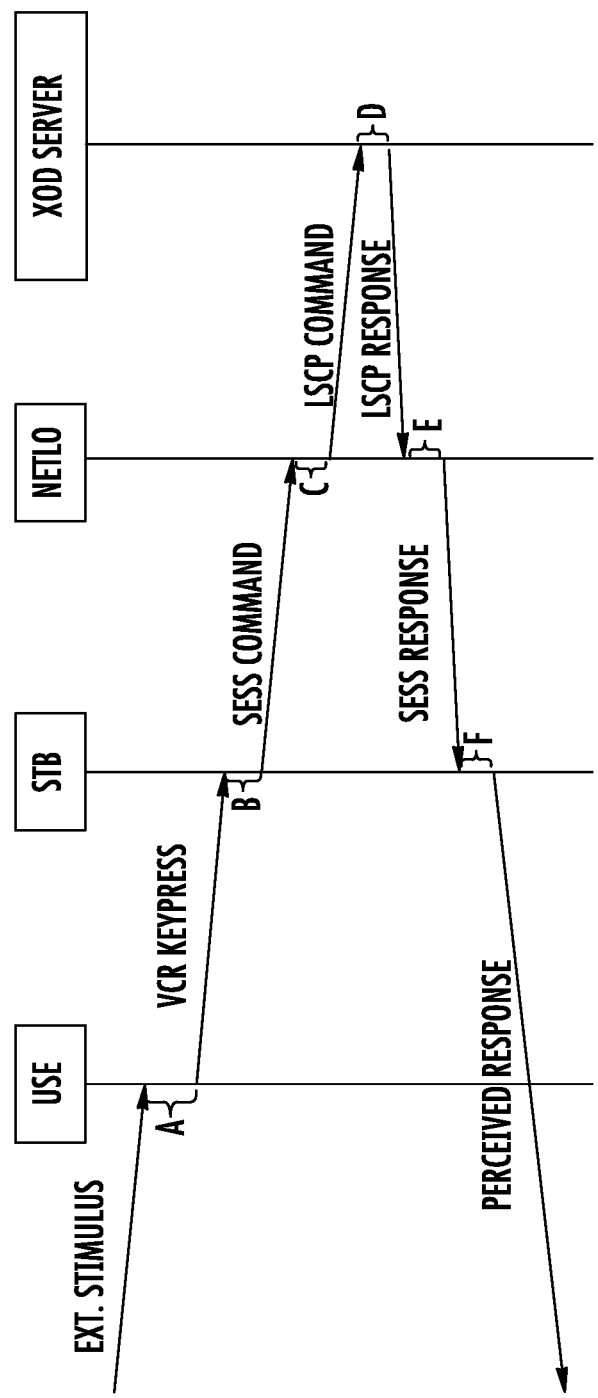
FIG. 1 is a graphical representation of the various delays present in servicing a user command in a typical prior art content-based network.

Reference is now made to the drawings wherein like numerals refer to like parts throughout.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, inter-acts, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H323, etc.).

As used herein, the term "head-end" refers generally to a networked system controlled by an operator (e.g., an MSO multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that customers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli or MPx 220 devices, J2ME equipped devices, cellular telephones, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, CIC++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

Overview

In one exemplary aspect, the present invention provided methods and apparatus for implementing dynamic compensation for varying functional (e.g., trick mode) delays with a session-based network environment.

In one embodiment, these methods and apparatus make use of a "hysteresis" approach based on a rolling or moving average of delays within the system in order to provide accurate trick mode operation and prevent inaccurate or erratic changes in the content stream viewed by the user, as well precluding the user from having to issue one or more follow-up trick mode commands in order to compensate for these inaccurate/erratic changes. By obviating these follow-up commands, network bandwidth is conserved, thereby (i) reducing the latency associated with servicing such commands, and (ii) increasing user satisfaction by providing timely and accurate trick mode functionality.

In the exemplary embodiment, session establishment and command data flow are advantageously implemented using protocols and bandwidth that are typically used for delivery and control of video-on-demand (VOD) or similar services, thereby obviating any substantive modifications to the existing network infrastructure. Hence, the present invention is effectively transparent to other system processes and layers of the CPE protocol stack and any head-end or distribution server processes.

The dynamic latency compensation methods and apparatus of the invention are also completely agnostic to the type of payload data being transmitted, thereby allowing the transfer of literally any type of content over the network.

The methods and apparatus disclosed may be used with literally any session-based video or content streaming applications that allow (or require) interaction between the client and a server.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multi systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a network providing service to a customer (i.e., home) end user domain, the present invention may be readily adapted to other types of environments including, e.g., commercial/enterprise, and government/military applications. Myriad other applications are possible.

System Architecture

Figure 2:
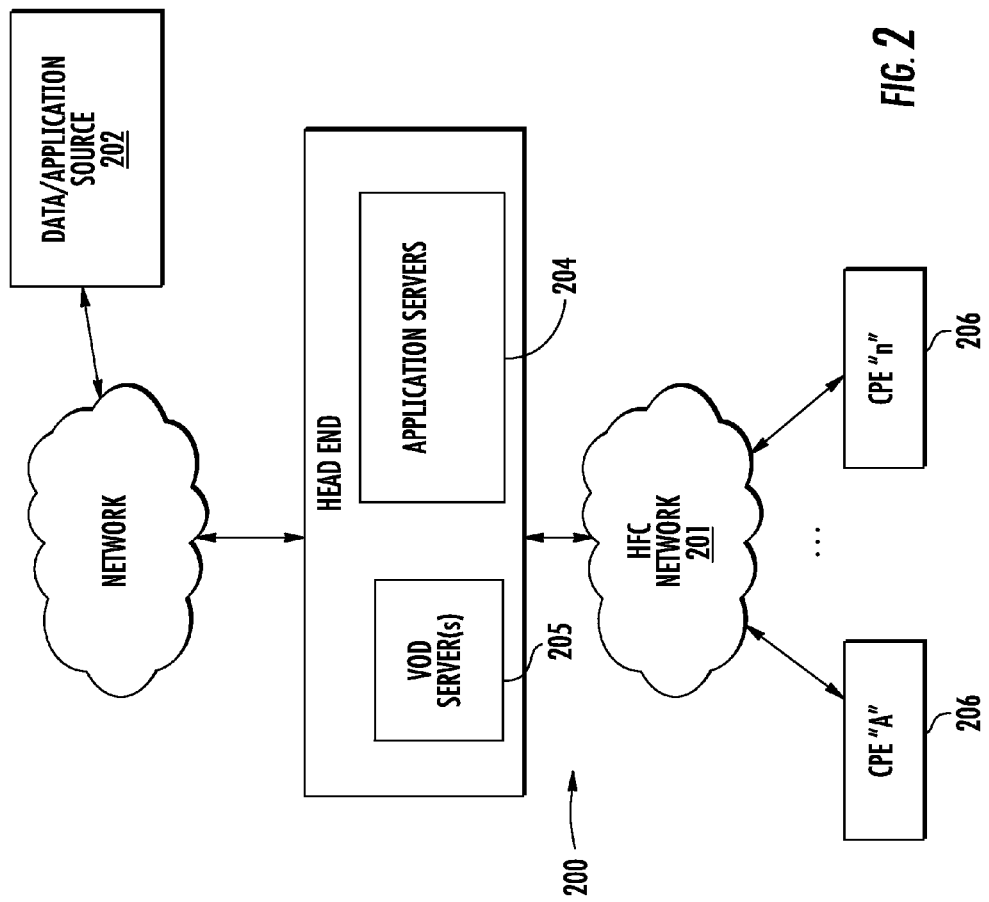
FIG. 2 is a functional block diagram illustrating an exemplary HFC network configuration useful with the present invention.

FIG. 2 illustrates a typical content-based network configuration with which the dynamic latency management apparatus and methodology of the present invention may be used. The various components of the network 200 include (i) one or more data and application origination points 202; (ii) one or more application distribution servers 204; (iii) one or more VOD servers 205, and (iv) customer premises equipment (CPE) 206. The distribution server(s) 204, VOD servers 205 and CPE(s) 206 are connected via a bearer (e.g., HFC) network 201. A simple architecture comprising one of each of the aforementioned components 202, 204, 205, 206 is shown in FIG. 2 for simplicity, although it will be recognized that comparable architectures with multiple origination points, distribution servers, VOD servers, and/or CPE devices (as well as different network topologies) may be utilized consistent with the invention. For example, the head-end architecture of FIG. 2a (described in greater detail below) may be used.

The application origination point 202 comprises any medium that allows an application (such as a data download application or VOD-based application) to be transferred to a distribution server 204. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 204 comprises a computer system where such applications can enter the network system. Distribution servers are well known in the networking arts, and accordingly not described further herein.

The VOD server 205 a computer system where on-demand content, as well as the data discussed in greater detail below) can be received from one or more data sources 202 and enter the network system. These sources may generate the content/data locally, or alternatively act as a gateway or intermediary from a distant source. The VOD server 205 includes the Session Resource Manager (SRM) functionality, and asks the Digital Network Control System (DNCS) for resources. The DNCS responds with negative or positive response to the request, and the VOD server implements the appropriate resource allocation logic.

The CPE 206 includes any equipment in the "customers' premises" (or other locations, whether local or remote to the distribution server 204) that can be accessed by a distribution server 204. Such CPEs 206 comprise processors and associated computer memory (and optionally mass storage) adapted to store and run the downloaded or resident application, as well as receive and store the streamed in-band content and data. In one embodiment, at least a portion of the CPE application necessary to facilitate latency management and hysteresis "window" determination and implementation for a given user session can be downloaded to the CPE 206, wherein the latter executes the downloaded application(s)/components in order to enable the CPE to perform, e.g., statistical correction factor determination, although it will be recognized that the application(s) may also be resident on the CPE before download, received from another source (such as a third party Internet site, CD-ROM, etc.).

In another embodiment, the servicing network node (e.g., local hub with which the user's CPE communicates most directly) is adapted to perform all or a portion of the dynamic compensation calculations, since the variable delays all occur upstream and within the boundary of this node (e.g., see Fig. I, wherein all variable delays are included from the point of receipt of the trick mode command at the network node (beginning of period "C") to the point where the response is transmitted back to the CPE (end of period "E")). This is accomplished by obtaining the timestamp associated with the command from the CPE 206 (C_timestamp) and subtracting this value from the timestamp associated with transmission of the response packet from the node back to the CPE (E_timestamp), and then adjusting this difference for one-way propagation (e.g., dividing by 2).

Figure 2A:
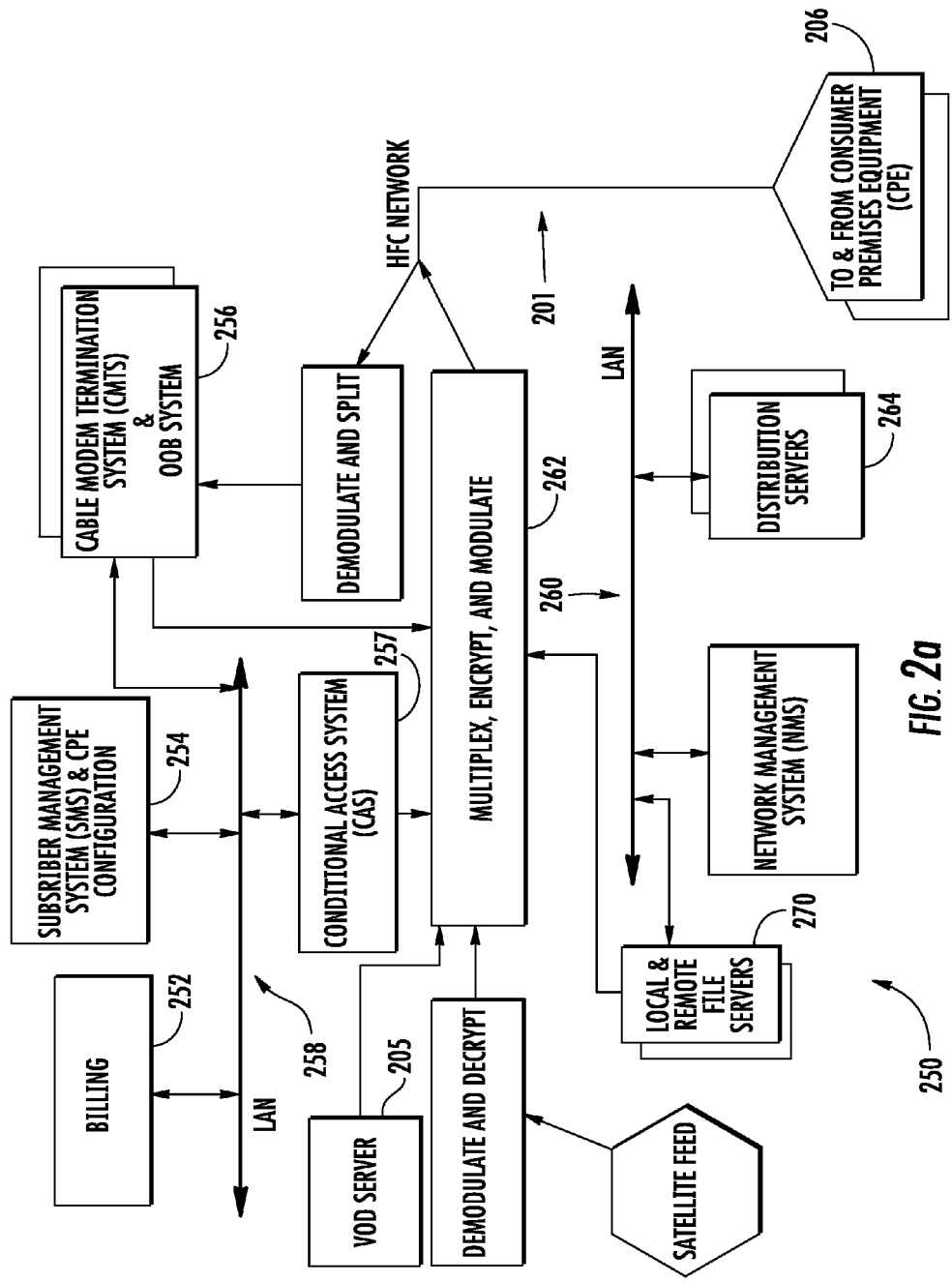
FIG. 2a is a functional block diagram illustrating one exemplary head-end configuration of the HFC network of FIG. 1.

Referring now to FIG. 2a, one exemplary embodiment of a head-end architecture useful with the present invention is described. As shown in FIG. 2a, the head-end architecture 250 comprises typical head-end components and services including billing module 252, subscriber management system (SMS) and CPE configuration management module 254, cable-modem termination system (CMTS) and OOB system 256, as well as LAN(s) 258, 260 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 2a is high-level, conceptual architecture and that each MSO may have multiple head-ends deployed using custom architectures.

The architecture 250 of FIG. 2a further includes a multiplexer/encrypter/modulator (MEM) 262 coupled to the HFC network 201 adapted to "condition" content for transmission over the network. In the present context, the distribution servers 204 are coupled to the LAN 260, which provides access to the MEM 262 and network 201 via one or more file servers 270. The VOD servers 205 are coupled to the LAN 260 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 250 to the CPE 206 ("downstream") are multiplexed together in the head-end and sent to neighborhood hubs (not shown).

Content (e.g., audio, video, etc.) is provided in each downstream (in-band) channel associated with the relevant service group. To communicate with the head-end, the CPE 206 uses the OOB or DOCSIS channels and associated protocols. The OCAP 1.0 specification provides for networking protocols both downstream and upstream.

It will also be recognized that the multiple session servers (ODNOD or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-owned United States Patent Application Publication No. 20020059619 to Lebar filed on Jun. 7, 2001, published May 16, 2002, entitled "Hybrid central/distributed VOD system with tiered content structure" and issued as U.S. Pat. No. 7,690,020 on Mar. 30, 2010, which is incorporated herein by reference in its entirety.

Specifically, a hybrid central/distributed and tiered video on demand (VOD) service network with tiered content structure is disclosed. In particular, the system uses media servers located in both the head-end and hub stations. Set-top boxes generally would be supplied VOD services from the high-demand content media (and data) servers located in the hub station nearest to the user. The central media server located in the head-end would be used as an installed backup to the hub media servers; as the primary source for lower demand VOD services and as the source of the real time, centrally encoded programs with PVR (personal video recorder) or trick mode capabilities. By distributing the servers to the hub stations, the size of the fiber transport network associated with delivering VOD services from the central head-end media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

Many other permutations of the foregoing system components and communication methods may also be used consistent with the present invention, as will be recognized by those of ordinary skill in the field.

Methods

Figure 3:
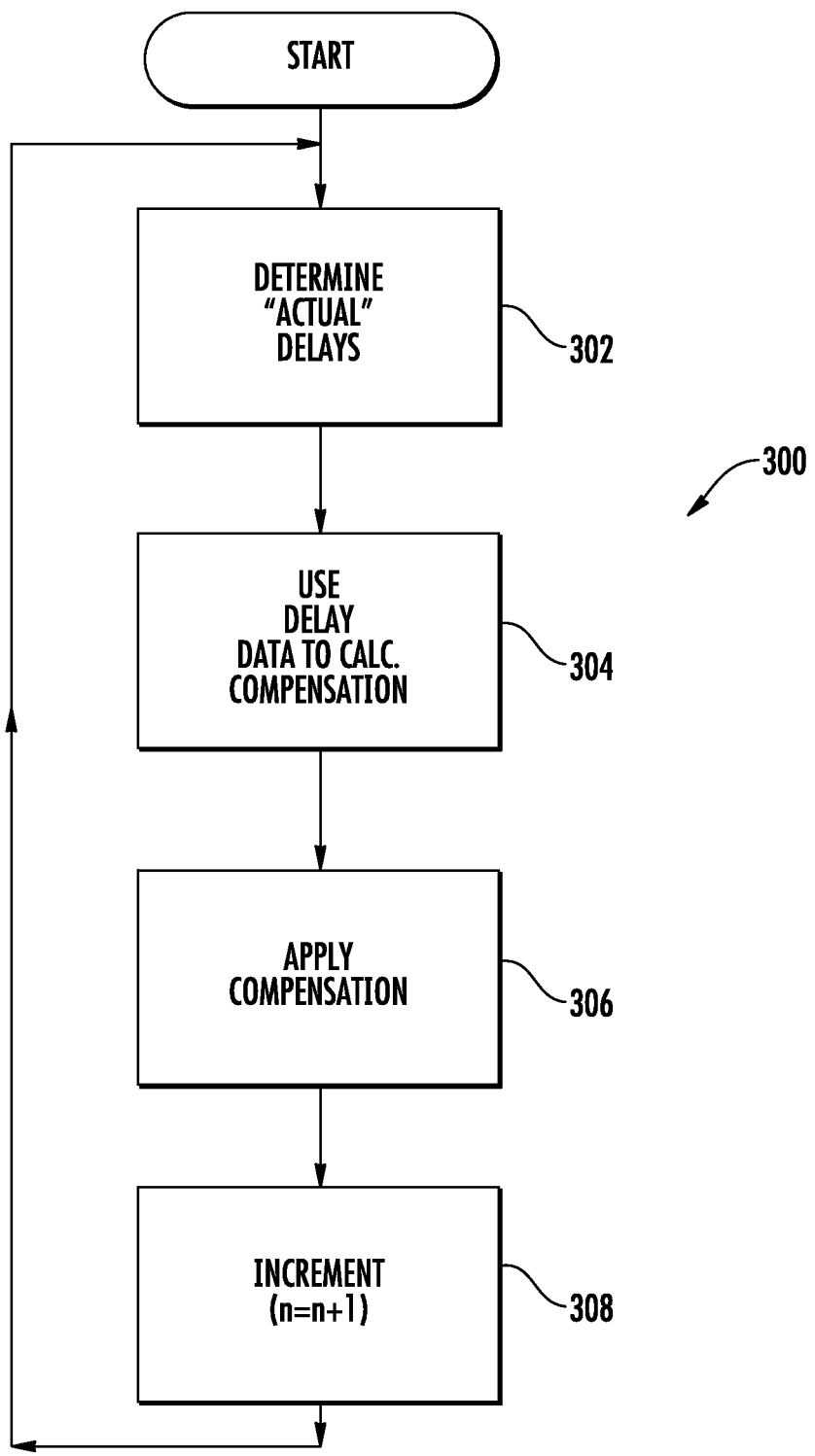
FIG. 3 is a logical flow diagram illustrating one embodiment of the generalized methodology of dynamically managing functional performance within a network according to the invention.

Referring now to FIG. 3, one exemplary generalized methodology of managing the latency of trick mode or other session-based services over a network is described. It will be recognized that the steps shown in the embodiment of FIG. 3 are high-level logical steps applicable to literally any cable on-demand (e.g., VOD) architecture, and are not intended to require or imply any specific process flow that may occur within particular implementations of the method. In practical embodiments, some of these steps (or sub-steps within each step) may be implemented in parallel, on different hardware platforms or software environments, performed iteratively, and so forth.

In the VOD delivery system described with respect to FIGS. 2 and 2a above, the content (e.g., VOD) server 205 sends out content as a sequence of video frames in a predetermined order during a session established between a user's CPE and the server. While the content server can accurately determine the time at which it receives a trick mode request from the user's CPE 206, it does not have timing information (or frame index) for the precise video frame that the viewer was watching when the trick mode request was issued. While typical cable system CPE are synchronized to the headend, local clock values may be different and uncompensated for network delays. Hence, there is no "absolute" time reference supplied to the server as to when the trick mode command was issued by the CPE.

Since a VOD server 205 does not know the exact time or the frame index when a trick mode command was issued, it must generate an estimate of when the trick mode command was actually instigated relative to the media stream. Unlike the prior art fixed offset or compensation systems previously described, the present invention provides an improved technique for performing this estimate, thereby more accurately determining the exact instant (frame index) when the trick mode command was issued and hence making the system seem more responsive and timely to the viewer.

As shown in FIG. 3, the exemplary embodiment of the present methodology 300 comprises applying a statistical correction factor that is both (i) adjustable at the head-end, and (ii) dynamically adjustable in the client device (e.g., CPE) itself. Specifically, the method first gathers data regarding one or more actual delays that were previously determined, per step 302. It will be appreciated that while the exemplary embodiments of the invention utilize a mechanism (described below in detail) wherein the actual time delay present in the network at a given point in time is utilized as the basis for the compensation, the value used need not be empirical in nature. For example, instead of utilizing timestamps from actual commands or packets transmitted over the network, an a priori or deterministic approach may be used, such as where the actual variable delays are predicted according to a formula or indirectly via series of other measurements or deterministic quantities. While a posteriori or anecdotal measurements will generally produce the most accurate results, the use of deterministic or a priori approaches may yield sufficiently accurate results as well. Such deterministic or a priori approaches are to be contrasted with the prior art "static" approaches in that the latter are in no. way variable as a function of time, or related to other system parameters.

The "actual" data (whether a posteriori, a priori or otherwise) is then used to calculate a new compensation value (step 304). The new compensation value is then applied to the next trick mode or other functional command issued by the user's CPE (step 306), such as to correct the normal play time (NPT) value determined as part of that command. The process 300 then increments (step 308), and returns to determination of the next compensation value using the foregoing approach in an iterative fashion. Hence, the method 300 involves a constantly changing or "rolling" update of the compensation value as a function of then existing network delays.

Figure 3A:
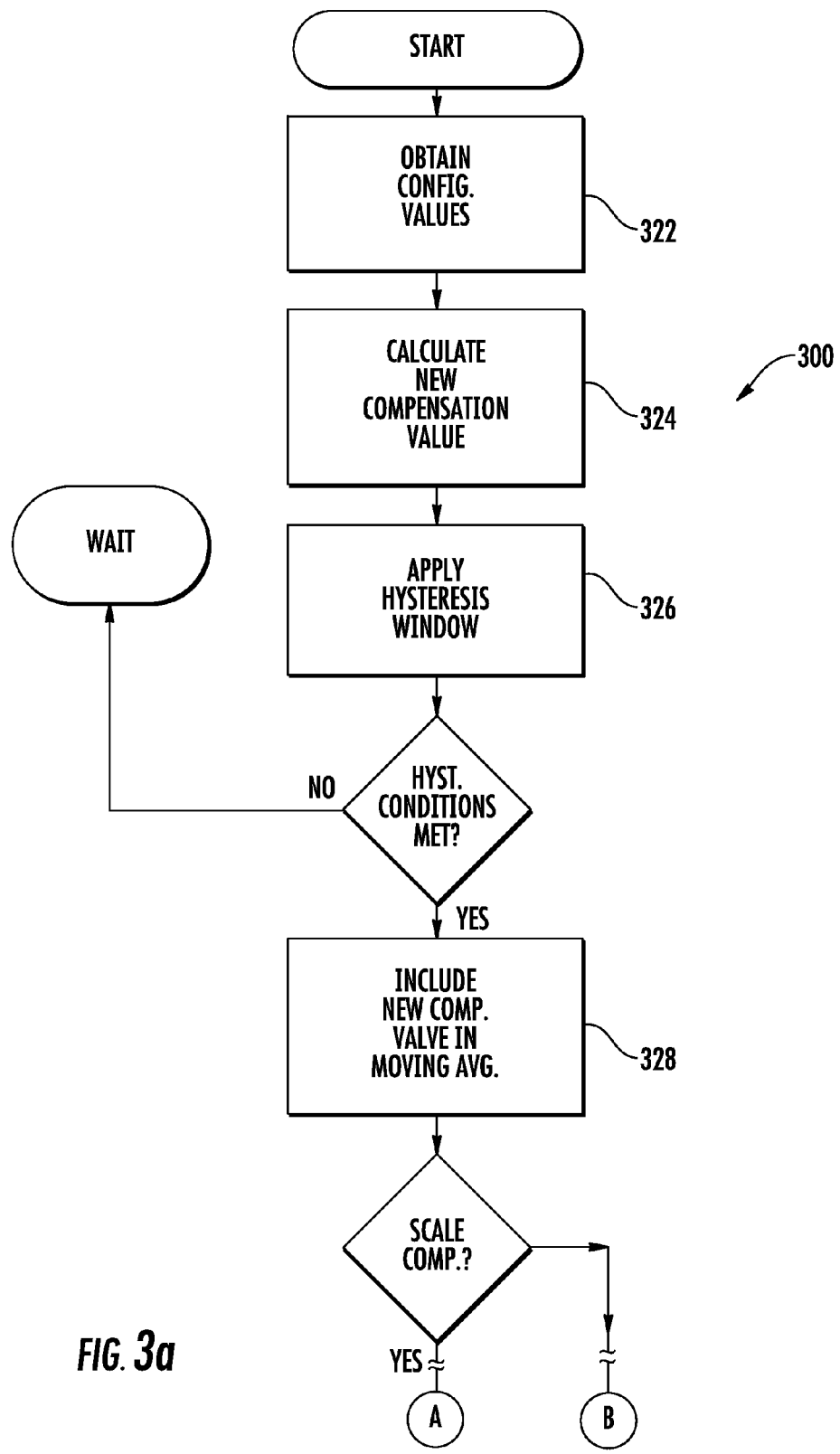
FIG. 3a is a logical flow diagram illustrating one specific embodiment of the method of FIG. 3 in the context of a "trick mode" command during an on-demand session.
Figure 3A:
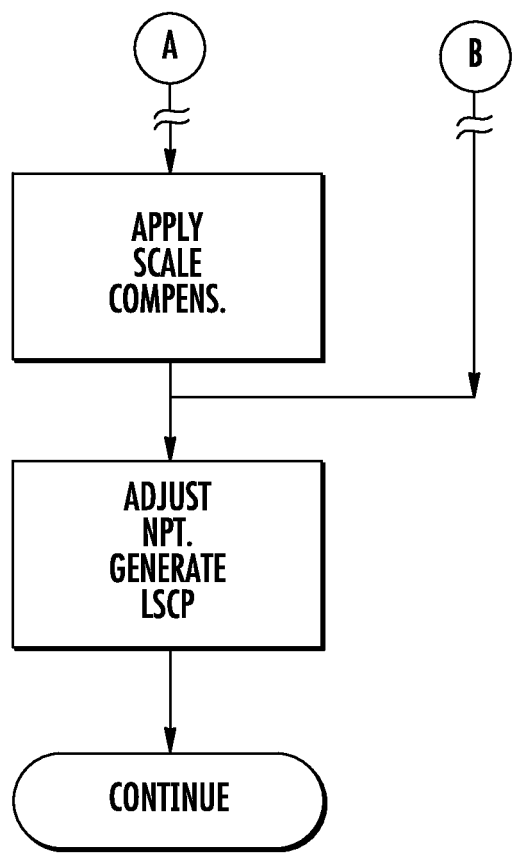

FIG. 3a illustrates one exemplary implementation of the generalized method 300 of FIG. 3, adapted for the specific context of a cable network with on-demand (OD) or similar trick mode functionality. In this implementation, the correction factor calculation comprises taking one-half (½) of the round-trip trick-mode command/response time (with a window of "hysteresis" applied, as described in greater detail below) that is averaged into a previous correction value, which itself is based on a rolling or moving average. If the applied correction proves to be insufficient due to highly varying network delays (or other causes), additional corrections will be applied over time, while the hysteresis window will advantageously act to mitigate unstable corrections.

As shown in FIG. 3a, the method 320 comprises first obtaining the constant (e.g., MSO configurable) values for the compensation equation (step 322). In the exemplary HFC network, these may include the designated user response time (userResponse), hysteresis or window value (hysteresis), and the rate compensation (rate Comp), although other values may be used as well depending on the particular configuration.

Next, the latest or most current compensation value (newComp) is calculated per Eqn. (1) in step 324:

$$\text{newComp}=(((E\_timestamp-C\_timestamp)+userResponse) \quad \text{Eqn. (1)}$$

where:
E_timestamp=the timestamp value at node E, or issuance of the session response by the serving node (see Fig. I); and
C_timestamp=the timestamp value at node C, or receipt of the session command by the serving node (see Fig. I).

Hence, the difference between E_timestamp−C_timestamp of Eqn. (!) quantifies the variable delays imposed by the network (i.e., items C, D, and E of Table I). This difference is then divided by two (2) in order to place the compensation value on a one-way basis (i.e., adjust for round trip, which assumes that the variable delays are symmetrically disposed), and then added to the user response time (see Item A in Fig. I and Table 1). It will be appreciated that more sophisticated approaches and algorithms to determination of the one-way delay in the desired direction may be used in the case where the upstream and downstream delays are not substantially symmetric, with the relationship of Eqn. (I) generally providing good results with the advantages of simplicity and low processing overhead.

Per step 326, a hysteresis window is applied and adjusted if necessary, according to the relationship of Eqn. (2):

$$If(((currComp+hysteresis)<newComp)II((currComp-hysteresis)>newComp)) \quad \text{Eqn. (2)}$$

and the new compensation value included within the current compensation value (currComp) via a moving or rolling average if appropriate as in Eqn. (3) per step 328:

$$currComp=((currComp+newComp)/2) \quad \text{Eqn. (3)}$$

The two conditions present in Eqn. (2) above (i.e., (currComp+hysteresis)<newComp)), and ((currComp-hysteresis)>newComp)) define the upper and lower bounds of the hysteresis window. This window of hysteresis ensures that no change to the current compensation value will take place unless the prescribed condition is met, thereby mitigating erratic behavior. By preventing such change from occurring (unless the new compensation factor exceeds this window), the stability of the system is increased since only compensations of a given magnitude will be considered.

In the exemplary variant of the method 320, the data regarding the one (1) previous delay (inherently reflected in the currComp value)) is used, although it will be appreciated that the moving average may comprise N prior calculated delays (N=1, 2, . . . n). For example, the calculation may comprise taking the prior five (5) compensation values, which may be stored locally, and calculating the current compensation value based on an average of these values, thereby providing a moving window of five prior values as in Eqns. (4) or (5) below:

$$currCompn\ o=(((:E\ currCompn\ J\ldots s)/5+newComp)/2) \quad \text{Eqn. (4)}$$

$$currCompn\ o=(((:E\ currCompn\ldots 5+newComp)/6) \quad \text{Eqn. (5)}$$

The relationship of Eqn. (4) weights the average of the prior five values equally with the new compensation value, while the relationship of Eqn. (5) weights all of the values (i.e., five prior values and the new value) equally. It will be appreciated that myriad other weighting and averaging schemes may be used consistent with the invention, the foregoing being merely illustrative of the broader principles. For example, statistical processes may be applied (e.g., such as where the compensation values are weighted or distributed according to a Gaussian or other mathematical distribution that is derived, for example, a posteriori from historical network loading data).

Per step 330, a (static) adjustment for the scale of a given trick mode command is optionally applied according to Eqn. (6):

$$currComp+=rateComp \quad \text{Eqn. (6)}$$

Lastly, per step 332, the command (formatted in Lightweight Stream Control Protocol {LCSP} or other applicable protocol) is sent with an adjusted NPT (Normalized Play Time) value according to Eqns. (7) and (8) below:

$$C\ timestamp=lscpCommand(command, scale, max ((npt-currComp), 0) \quad \text{Eqn. (7)}$$

$$\pounds\_timestamp=lscpResponseO \quad \text{Eqn. (8)}$$

As is well known, the LSCP allows, inter alia, VOD client sessions to communicate directly with a VOD server to control the content as well as streaming trick modes. However, it will be recognized that other protocols providing the desired functionality may be used consistent with the present invention.

Appendix I hereto provided exemplary pseudocode for implementing the foregoing process within a cable network.

In operation, the methodology 320 of FIG. 3a produces a slight overshoot of the NPT requested by the user. For example, the requested NPT on a rewind command would produce an actual NPT slightly before the requested NPT in the stream. In this case, the dynamic compensation is effectively added to the delayed NPT value to compensate for the fact that the network delay makes the user's cessation of rewinding be recognized by the server (or other entity servicing the request) somewhat later than the real or target time associated with their entry of the command; e.g., the server response lags the user letting off the rewind button on their remote. Hence, the present embodiment of the invention compensates by adding the dynamically determined compensation amount to the delayed NPT to get as close as possible (albeit just slightly before) the target NPT. Conversely, during a fast forward (FF) command, the delay between the user releasing the FF button and the servicing entity (e.g., VOD server) stopping the FF function causes some degree of overshoot; hence the compensation is subtracted from the actual NPT in order to place the user at the target NPT (or again just slightly before).

In this fashion, play of the stream after servicing of the user command is commenced at a section of the stream that the user is familiar with (but not so far off that they must fast-forward or rewind to the precise point where they want to resume viewing). This approach compensates for variable latencies within the network, yet also obviates the user having to issue multiple commands, since the actual versus target NPT coordinates are close enough.

It will be recognized that a "wrap" or circularity of a timestamp may occur in certain applications (e.g., this event happens approximately every 49.7 days in the exemplary HFC implementation described herein). This wrap can be readily compensated for; see, e.g., the code of Appendix I.

It is noted that the trick-mode functionality may have a specific scale or rate associated with it that further offsets the compensation (see Eqn. (6) above). In one embodiment, the scale or rate gradients of the various trick mode functions are invoked based on user selections, and are effectively constant; e.g., such as where the user is presented with multiple rewind (REW) or fast-forward (FF) functions such as via (i) discrete buttons on their remote, or (ii) multiple software-generated options as part of their VOD or interactive on-screen application. For example, FF1 (or a single arrow ">"), FF2 (a faster-forwarding mode, or double arrow">>") and FF3 (a yet faster mode, or triple arrow">>>") might comprise three user-accessible fast-forward trick modes in the exemplary embodiment. These multiple modes may be linear; e.g., where FF2/>> equals 2 times the rate of FF1/>, and FF3/>>> equals 3 times the rate of FF1, and so forth. Alternatively, these relationships may be non-linear, such as where FF1/FF2/FF3 are related by a geometric, exponential, or other such relationship (e.g., X/2X/4X, respectively)

In another variant of the invention, the scale or rate of the trick mode is substantially constant yet not user-selectable (e.g., one FF mode that has a constant rate).

As still another variant, the scale or rate factors are selected (at least at a logical level) based on user command selections, yet variable below the logical level. For example, the rate factors may be wholly or partly related to one or more operational parameters, such as the value of the compensation or correction calculated over a given interval as previously discussed, in a deterministic fashion. Hence, where a lesser or greater magnitude correction is calculated and applied, it may be desirable to have the rate factors associated with a given function (e.g., FF1/FF2/FF3) scale accordingly, either in linear or non-linear proportion, thereby coupling the function rate to the latency of the network. This may be useful in managing the user's perception regarding the trick mode functions; i.e., during periods of comparatively high latency (load) in the network, it may be desirable to make the FF function work imperceptibly more slowly, so as to control the user's expectation of when the function should be completed. Clearly, the user will not expect the FF function to complete at least until they release the associated button on their remote or client device, and hence by slowing the rate of FF operation, the system effectively buys itself more time to respond. Consider the converse, where the FF function is effectively instantaneous (i.e., the forward frame progression rate is extremely fast), wherein the system is effectively allowed very little latency or time to respond.

CPE Architecture and Operation—

As previously noted, one exemplary embodiment of the present invention allows for the control of the applied correction factor both from the head-end (e.g., via the hysteresis, rate compensation, and user response parameters) and the client side (i.e., via the dynamic calculation of the "current" compensation factor).

Figure 4:
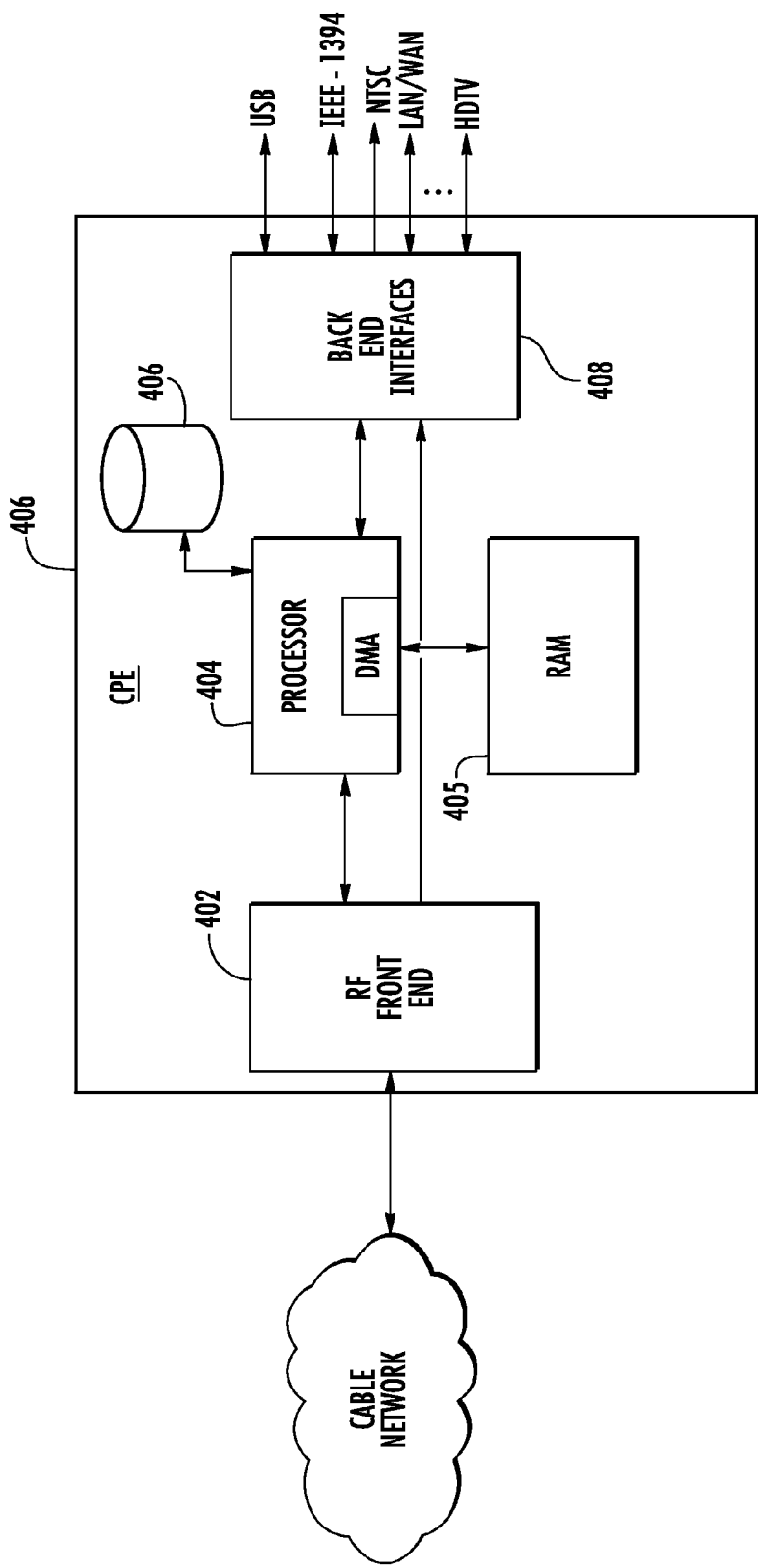
FIG. 4 is a functional block diagram of one exemplary embodiment of network CPE adapted for dynamic trick mode compensation.

FIG. 4 illustrates a first embodiment of the improved client device (e.g., CPE 206) with dynamic compensation capability according to the present invention. As shown in FIG. 4, the device 206 generally comprises and OpenCable-compliant embedded system having an RF front end 402 (including demodulator and decryption unit) for interface with the HFC network 201 of FIG. 2, digital processor(s) 404, RAM 405 and mass storage device 406, and a plurality of interfaces 408 (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the device (deleted from FIG. 4 for simplicity) include RF tuner stages, buffer memory (which may be implemented in the RAM 405 or otherwise), various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 206 of FIG. 4 is also provided with an OCAP-compliant monitor application and Java-based middleware which, inter alia, manages the operation of the device and applications running thereon. It will be recognized by those of ordinary skill that myriad different device and software architectures may be used consistent with the display element manager of the invention, the device of FIG. 4 being merely exemplary. For example, different middlewares (e.g., MHP, MHEG, or ACAP) may be used in place of the OCAP middleware of the illustrated embodiment.

Figure 4A:
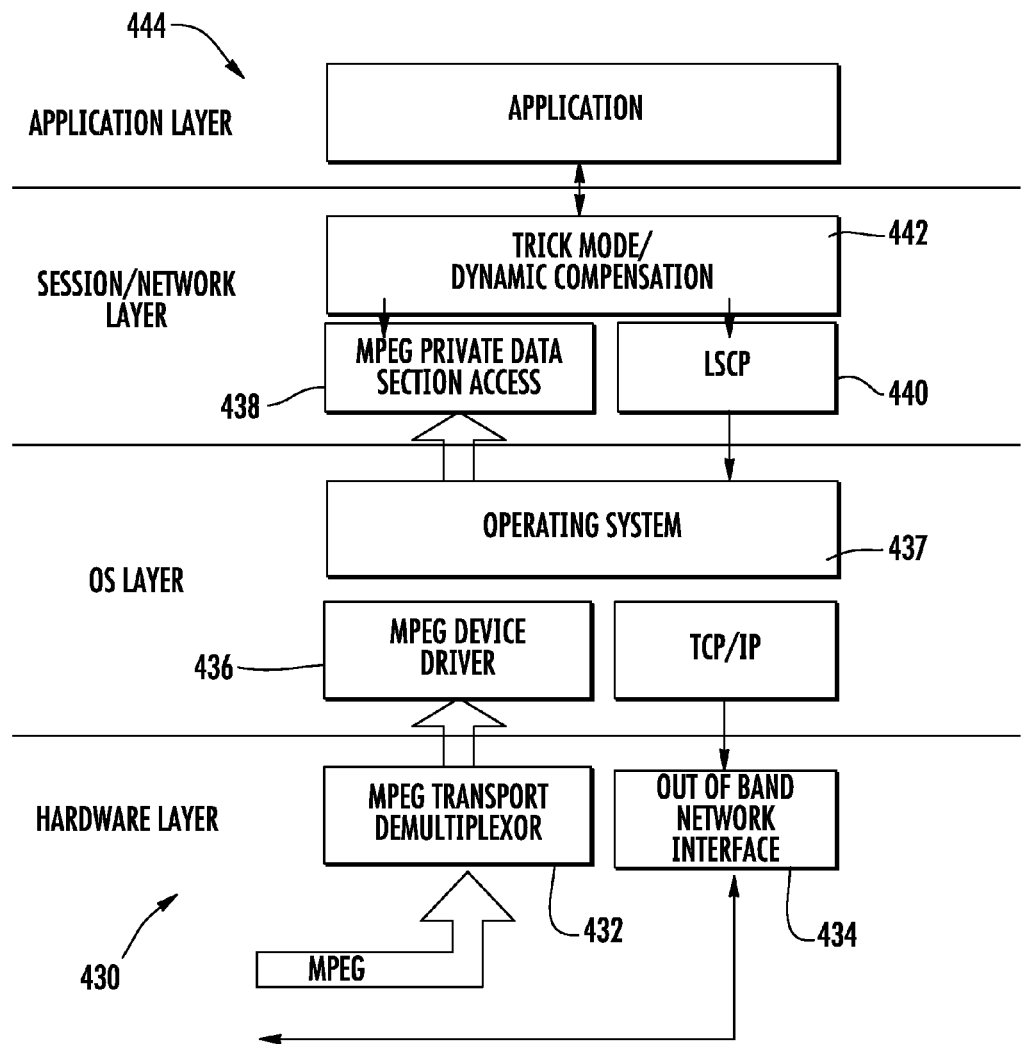
FIG. 4a is a graphical representation of the protocol stack of the exemplary CPE of FIG. 4.

FIG. 4a illustrates an exemplary configuration of the protocol stack 430 used on the CPE 206 of FIG. 4. Elements of this embodiment of the stack 430 include: (i) MPEG transport interface (demultiplexer) 432, (ii) OOB network interface 434, (iii) MPEG device driver 436, (iv) operating system (including aforementioned middleware) 437; (v) LSCP protocol module 440, and (vi) trick mode control module 442. Regarding the trick mode module, the MPEG driver is advised of initiation of trick modes, and accordingly places the relevant decoder in trick mode, typically by writing to a control register and/or changing the signal status of a pin. Accordingly, while the illustrated embodiment shows the trick mode functionality (and dynamic compensation) as a separate software module, some implementations may choose to incorporate this functionality within the MPEG driver/decoder.

Also, while the trick mode/dynamic compensation software is shown disposed within the/a session layer of the stack, it will be appreciated that other implementations may be used. For example, in a typical OSI stack model, the Session Layer (Layer 5) comprises a substantially discrete layer disposed directly above the Transport Layer. However, in other architectures (such as the Wireless Application Protocol (WAP) or the like), the "session layer" (e.g., WAP session protocol) is disposed atop other interposed layers such as WTLS or TLS. Hence, the present invention should in no way be considered limited to the Session Layer of the OSI model.

As indicated in FIG. 4a, the received MPEG data may be buffered and viewed directly, or stored by a local (or even remote) storage device 406 (or alternatively RAM 405). The application layer 444 of the stack 430, such as the user's VOD application, uses the MPEG data to generate the viewer's display. Furthermore, the application generates any iconic or other on-screen or audible indications (such as the aforementioned FF arrows) in conjunction with the trick mode or similar function selected by the user.

As part of the application layer 444 of the CPE 206, various different types of client applications may be running (or operable to run) consistent with the present invention. In one embodiment, a separate (dedicated) client application adapted for VOD or other session-based services may be used to interface with the lower layers of the stack 430 (including the trick mode control module 442). This may include, e.g., a separate GUI or other type of UT, and may operate substantially independent of other applications on the CPE 206.

The delay compensation functionality of the present invention is ideally completely transparent to the end user, such that when a trick mode function is selected, each of the foregoing calculations and compensations are performed seamlessly during the operation of that mode. The only salient change of the exemplary implementation over the operation of prior art compensation approaches comprises and increased accuracy of the trick mode function. However, the invention may also be configured to provide the user with access to the compensation function (or at least selection of certain metrics used in governing the operation thereof). For example, the user may be provided a trick mode compensation "setup" menu that allows adjustment of parameters, such as the assumed user response time or hysteresis window (these can be rendered, e.g., as fuzzy variables such as "slow", "medium" and "fast" or on a numeric scale such as 1-10).

This functionality, i.e., access to the dynamic compensation, might also comprise the basis of a business model or premium service, such as where particular users or classes of users have differentiated trick mode compensation performance or control. For example, premium subscribers may be given the ability to control the operation of their trick modes, or alternatively the MSO could provide the dynamic compensation as one of a bundle of benefits of a premium subscription.

Alternatively, the user may be completely removed from the delay compensation configuration process, such as where the compensation corrections imposed are derived solely based on configuration parameters from the head-end or other management entity and the CPE "background" compensation algorithms which are invisible to the user.

The CPE middleware and any other relevant components may also be modified in order to provide a "universal" software interface for the trick mode dynamic compensation function, such that application developers can write their applications to make use of this capability. Similarly, the "universal" CPE described in co-owned U.S. patent application Ser. No. 10/782,680 filed Feb. 18, 2004, entitled "MEDIA EXTENSION APPARATUS AND METHODS FOR USE IN AN INFORMATION NETWORK", and issued as U.S. Pat. No. 8,078,669 on Dec. 13, 2011, incorporated herein by reference in its entirety, may be used consistent with the present invention in order to allow specific features (including trick mode compensation) to be configured by a particular MSO or other entity when the CPE is used in their network.

Myriad other schemes for integrating the dynamic compensation functions within the existing CPE software environment will be recognized by those of ordinary skill in the software arts when provided the present disclosure, the foregoing being merely exemplary.

It can also be appreciated that the methods of the present invention may be practiced using any configuration or combination of hardware, firmware, or software, and may be disposed within one or any number of different physical or logical entities. For example, the dynamic compensation functionality described above may take the form of one or more computer programs running on a single device disposed within the network (e.g., a distribution node or hub). Alternatively, such computer programs may have one or more components distributed across various hardware environments at the same or different locations, wherein various of the functions are distributed across the CPE 206 and other network nodes. Hence, the present invention also contemplates a distributed processing model wherein portions of the dynamic compensation calculations and/or adjustments are performed at different locations throughout the network path between (and including) the CPE and the VOD server or other servicing entity.

As yet another example, portions of the functionality may be rendered as a dedicated or application specific IC having code running thereon. Myriad different configurations for practicing the invention will be recognized by those of ordinary skill in the network arts provided the present disclosure.

Network-Based Variants—

The foregoing embodiments of the invention are implemented using a CPE-based approach wherein the compensation calculations and determinations are at least primarily performed within the CPE 206. It will be recognized, however, that all or a portion of the compensation determination may be performed at other nodes or locations within the network.

For example, in one alternate embodiment, the local hub servicing a given CPE 206 can be tasked with performing the compensation determination. Specifically, the delays between the CPE 206 and the hub (both inbound and outbound) are generally known and constant. The variable portions of the delay of any significance all occur from the hub inward toward the core of the network, and hence the hub can be configured to, e.g., determine the delay between its receipt of a command from the CPE 206 and the requested action being issued back to the CPE. But for the additional delays between the CPE and the hub, this is largely identical to the methodology previously described. The compensation may then be transmitted to the CPE for application thereby, or even applied directly at the hub or VOD server if so configured, In another variant, the various constituent delays forming the total round-trip delay previously described can be determined and then aggregated into a total delay value. For example, the variable delay between the hub and server might be determined by the server (e.g., via information transmitted to the server with the command, such as a timestamp), and the delay between the server and the hub similarly determined by the hub. These two entities could then transmit this information to the CPE 206, which would determine the aggregate or total variable delay, and add the static delays (i.e., those between the CPE and the hub, etc.) thereto in order to derive an appropriate compensation. This approach is in contrast to that previously described; i.e., measurement of the total (aggregate) variable delay without having to determine the individual pieces which make up that total delay.

The aggregated or total delay approach carries with it the simplicity of only having to determine one total delay value (which can be accomplished entirely within the CPE 206), and hence obviates any overhead associated with transmitting delay information between the various nodes, which just further degrades available bandwidth.

However, the constituent or "piecemeal" approach provides the MSO or network operator with additional and more precise information on how its network is operating, and where specifically the variable delays are occurring. For example, the variable delay data for one or more legs of the roundtrip journey could be algorithmically or statistically analyzed to provide useful information on when (i.e., at what times and/or under which operating conditions) the variable delays are largest or most variable, and hence least predictable. If one leg of the network is particularly prone to large variable delays during a given period, data traffic could be, e.g., rerouted or otherwise controlled during these periods so as to minimize the effect of these large variable delays. This level of information granularity is not available with the more simplified (i.e., aggregate) approach described previously herein.

It will also be recognized that a heterogeneous or mixed approach may be used, such as wherein the aforementioned constituent or "piecemeal" approach is used on a sampling or periodic basis, or deterministically when other network loading metrics indicate that no significant effect on bandwidth will occur. For example, one simple scheme comprises periodically sampling the various constituent variable delays and collecting this data in a database for subsequent network loading and efficiency analysis. Each hub, for instance, could be configured to periodically measure variable delay inward toward the core once every given period of time, and pass this data back to the head end, or another node (such as a processing entity located at a given IP address). As another alternative, the two schemes (aggregate and constituent) can be swapped out based on network loading, with the aggregate approach being preferentially used during periods of high network demand so as to avoid any adverse effects on bandwidth that may result from the constituent approach.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

EXEMPLARY CODE
© Copyright 2004-2005 Time Warner Cable, Inc. All rights reserved.

```
#define MAXLONG 0xFFFFFFFF
// Get the constant (MSO configurable) values for the equation
userResponse = msoDhctConfigValues.userResponse;
hysteresis = msoDhctConfigValues.trickModeHysteresis;
rateComp = msoDhctConfigValues.trickMode[command].rateComp;
// Calculate the latest compensation value
newComp = (((E_timestamp − C_timestamp) / 2) + userResponse);
// Apply the hysteresis and adjust if necessary
```

APPENDIX I-continued

EXEMPLARY CODE
© Copyright 2004-2005 Time Warner Cable, Inc. All rights reserved.

```
If(((currComp + hysteresis) < newComp) || ((currComp − hysteresis) >
newComp))
{
    // fold in the new compensation value (rolling average)
    currComp = ((currComp + newComp) / 2);
}
// Static adjustment for scale of given command
currComp += rateComp;
// Send the LSCP command with an adjusted NPT (Normalized Play
Time)
C_timestamp = lscpCommand(command, scale, max((npt − currComp), 0);
E_timestamp = lscpResponse( );
// Handle the wrap of a ms timestamp
If(C_timestamp > E_timestamp)
{
    E_timestamp += (MAXLONG-C_timestamp);
    C_timestamp = 0;
}
```

What is claimed is:

1. A computerized method of enabling trick mode functionality to a computerized device during a video on-demand (VOD) session, comprising:
receiving a trick mode command from a user via said computerized device;
generating a compensation value for said trick mode command, said compensation value representative of a duration of time during which said user performs said trick mode command;
adjusting said compensation value based at least in part on a predicted delay to produce an adjusted compensation value, said predicted delay being associated with a latency in executing a command by said user and configured to vary based at least in part on information obtained from a network entity of a managed network, said information comprising a metric of predictability specific to one or more portions of said managed network; and
applying said adjusted compensation value to data being provided to said user via said device, said applying comprising, during time periods when a latency of said managed network exceeds a prescribed threshold, causing said trick mode functionality to operate slower than during time periods when said latency of said managed network is less than or equal to said prescribed threshold;
wherein said slower operation is of a magnitude that is imperceptible to said user.

2. The method of claim 1, further comprising:
predicting a delay associated with said managed network based at least in part on said information relating to said one or more system parameters within said managed network; and
further applying said delay to said adjusted compensation value in order to enable a rate of said trick mode command to be coupled to a latency of said user and said managed network.

3. The method of claim 2, further comprising:
receiving updated information relating to said one or more system parameters within said managed network;
using said updated information to determine an updated delay; and
applying said updated delay to said performance of said adjusted compensation value.

4. The method of claim 2, wherein said predicting said delay associated is further based at least in part on a prescribed formula.

5. The method of claim 1, wherein said information obtained from said managed network entity comprises data collected at a database on a periodic basis during certain periods of time and analyzed for network loading and efficiency during said certain periods of time.

6. The method of claim 1, wherein said metric of predictability specific to one or more portions of said managed network is dependent on a geographic area where said user is located during a certain time.

7. A computerized consumer electronic device adapted to provide video control functionality, comprising:
   a processor apparatus;
   a storage device operatively coupled to said processor apparatus; and
   at least one computer readable apparatus configured to run on said processor apparatus and comprising a plurality of instructions which are configured to, when executed:
      provide a user interface whereby said user can enter one or more video control functions;
      receive a plurality of dynamically determined values relating at least in part to operational parameters within a network;
      utilize said plurality of dynamically determined values to continuously generate a current compensation value for said one or more video control functions; and
      apply said current compensation value to a performance of said one or more video control functions such that, during time periods when a latency of said network exceeds a prescribed threshold, said one or more video control functions operate slower than during time periods when said latency of said network is less than or equal to said prescribed threshold.

8. The computerized consumer electronic device of claim 7, wherein said continuous generation of said current compensation value comprises:
   utilization of values relating at least in part to dynamically updated operational parameters within said network to dynamically generate a new compensation value; and
   application of said new compensation value to said performance of said of said one or more video control functions.

9. The computerized consumer electronic device of claim 7, wherein said plurality of instructions are further configured to, when executed:
   receive a prescribed formula for utilization of said plurality of dynamically determined values relating at least in part to operational parameters within said network;
   wherein said generation of said current compensation value comprises utilization of said plurality of dynamically determined values and said prescribed formula.

10. The computerized consumer electronic device of claim 7, wherein said dynamically determined values relating at least in part to operational parameters within said network are provided to said computerized consumer electronic device via an out-of-band data communication channel.

11. The computerized consumer electronic device of claim 7, wherein said current compensation value is further based on a hysteresis value and a rate compensation.

12. The computerized consumer electronic device of claim 7, wherein said slower operation is of a magnitude that is imperceptible to said user.

13. The computerized consumer electronic device of claim 7, wherein said generation of said current compensation value is based at least in part as a moving average of a prior iteration of said current compensation value and a new compensation value, said new compensation value derived from a fraction of a round-trip delay value measured within at least a portion of said network.

14. A computerized method for providing video control functionality within a network, said computerized method comprising:
   providing a user interface whereby said user can activate one or more video control functions;
   receiving a plurality of data corresponding to dynamically determined values, the dynamically determined values relating at least in part to one or more operational parameters within the network;
   utilizing said plurality of data corresponding to the dynamically determined values to generate at successive times a plurality of respective then-current compensation values for said one or more video control functions; and
   applying at least a portion of said plurality of then-current compensation values to a performance of said one or more video control functions such that, at least during time periods when a latency of said network exceeds a prescribed threshold, said one or more video control functions operate slower than during time periods when said latency of said network is less than or equal to said prescribed threshold.

15. The computerized method of claim 14, wherein said receiving said data corresponding to said plurality of dynamically determined values comprises receiving data relating to the one or more operational parameters provided by a node of said network.

16. The computerized method of claim 14, wherein said receiving said data corresponding to said plurality of dynamically determined values comprises receiving data related to one or more non-fixed delays within said network.

17. The computerized method of claim 14, wherein said receiving said data corresponding to said plurality of dynamically determined values comprises receiving statistically modeled data specific to one or more portions of said network, corresponding to said time periods, said modeled data specific to one or more prescribed operating conditions.

18. The computerized method of claim 14, wherein said applying at least a portion of said plurality of then-current compensation values to said performance of said one or more video control functions comprises establishing a functional relationship between a rate of said one or more video control functions and a latency of said user and said latency of said network.

19. The computerized method of claim 14, further comprising presenting a menu to said user, said menu comprising user-adjustable metrics that relate to at least one of said generated then-current compensation values, said user adjustable metrics enabled based at least in part on a subscription level of said user.

20. The computerized method of claim 14, wherein said plurality of data comprises data collected at a database on a periodic basis during certain periods of time and analyzed for network loading and efficiency during said time periods.

* * * * *